United States Patent Office 2,721,878
Patented Oct. 25, 1955

2,721,878

STRONG ACID AS A POLYMERIZATION MODIFIER IN THE PRODUCTION OF LIQUID POLYMERS

Alexander H. Popkin, New York, N. Y., assignor to Esso Research and Engineering Company, a corporation of Delaware No Drawing. Application August 18, 1951,
Serial No. 242,577

11 Claims. (Cl. 260—485)

This invention relates to an improved polymerization process. Particularly this invention relates to a process for the formation of lubricating oil additives having the desirable characteristic of improving the pour point and viscosity characteristics of lubricating oils with which they are blended. More particularly this invention relates to an improved process for the copolymerization of unsaturated polycarboxylic acid esters with other polymerizable monomeric materials in the presence of a minor amount of a strong acid to prevent undesirable gelation.

The art of lubricating oil additive manufacture has long been familiar with the preparation of polymers and copolymers to form materials useful for improving desirable characteristics of lubricating oils. Of particular interest in recent years has been the development of additive materials for improving the viscosity index, that is, for reducing the rate of change of viscosity of an oil with a change in temperature, and for improving the pour point of a lubricating oil, that is, lowering the temperature at which the lubricating oil loses its property of free flow. Such materials as polymers and copolymers of acrylate and methacrylate esters, polymers and copolymers of alpha-beta unsaturated polycarboxylic acid esters, etc., have been found to be very satisfactory for many purposes. It has also been found, however, that the preparation of these polymers and copolymers present many technical difficulties. Foremost among them is the problem of gelation and the formation of oil insoluble products. It is believed that this phenomenon is a result of undesirable cross linking or interlinking of neighboring long chain molecules with the result that the product formed remains a cohesive mass and will not dissolve in oil. In cases where there is insufficient cross linkage present to cause gelation and oil insolubility of the product, there may be present sufficient cross linkage to result in products having greatly reduced potency.

It has now been found, and forms the object of this invention, that copolymers having outstanding utility as pour point depressants and viscosity index improvers may be prepared by a process utilizing a small amount of a strong acid in the copolymerization step with the formation of a product which is free from any tendency toward oil insolubility and has increased potency as a pour point depressor and increased stability when employed as a viscosity index improver.

Generally speaking, this invention involves the admixture of the materials to be polymerized or copolymerized and subjecting the mixture to the action of a small amount of a strong acid during the copolymerization.

The improved process of this invention is applicable to the polymers or copolymers of copolymerizable materials in general. It has particular advantage, however, when applied to the copolymerization of esters of unsaturated polycarboxylic acids with other polymerizable monomeric materials in the presence of peroxide catalysts.

The unsaturated polycarboxylic acid esters may be represented by the following formula:

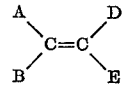

wherein:

(1) A and D are carboxylic acid ester groups

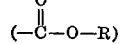

and B and E are hydrogen, e. g., fumaric acid esters, maleic acid esters, etc., or (2) A and D are carboxylic acid ester groups, as above, and either B or E is a methyl group, the other being hydrogen, e. g., citraconic acid esters, mesaconic acid esters, etc., or (3) A and B are hydrogen, D is a carboxylic acid ester group, and E is a methylene carboxylic acid ester group, e. g., itaconic acid esters, etc., or (4) A and D are carboxylic acid ester groups as above, E is a methylene carboxylic acid ester group, and B is hydrogen, e. g., aconitic acid esters.

The esters may be prepared by esterification of any of the unsaturated polycarboxylic acids or their corresponding anhydrides with which the art is familiar.

The alcohols used in preparing the esters of the polycarboxylic acids or their anhydrides are selected from the $C_1$ to $C_{18}$ aliphatic alcohols. Primary alcohols are preferred over secondary and tertiary alcohols, although secondary alcohols are sometimes suitable. The alcohols are preferably saturated, although some degree of unsaturation is permissible when mixtures of alcohols are employed. Straight chain or lightly branched alcohols are preferred over highly branched alcohols.

In the alcohols selected for preparing the esters, there should be sufficient hydrocarbon content to insure solubility of the final polymer products in lubricating oils, which in the case of most oils requires that the alcohols have on the average at least about 7.5 carbon atoms per molecule. When employing single alcohols those ranging from $C_8$ to $C_{18}$ are suitable. When mixtures of alcohols are employed, those ranging from $C_1$ to $C_{18}$ can be used in such proportions that the average is about $C_{7.5}$ or greater.

In general, the products prepared according to the invention are both pour point depressants and viscosity index improvers. However, for optimum potency it is usually desirable to select the alcohols used in preparing the esters so that the product will be primarily a pour point depressant or primarily a viscosity index improver. For optimum pour depressing potency in a wide variety of mineral lubricating oils the alcohols should have on the average about 11 to about 15, preferably 11.5 to 14, carbon atoms per molecule. For optimum potency as a viscosity index improver the alcohols should have on the average about 7.5 to 11, preferably 8 to 10, carbon atoms per molecule. Exceptions are sometimes found, for example, products prepared from relatively short chain alcohols are good pour depressants in relatively light oils such as those employed as hydraulic fluids and power transmission fluids. For potent pour depressants, alcohols having long straight chains are greatly preferred. Some branching in some of the alcohols is permissible, for example, mixed 2-ethylhexyl and cetyl alcohols are suitable, but a highly branched $C_{13}$ alcohol is entirely unsuitable for the production of pour point depressants unless employed with other alcohols having relatively long straight chains.

Among the alcohols that may be mentioned specifically as having utility in this invention are octyl, isooctyl, 2-ethylhexyl, nonyl, 2,2,4,4-tetramethylamyl, decyl dodecyl, tetradecyl, cetyl, and stearyl alcohols. Mixtures of the above are operable so long as the components of the mixture are adjusted so that the average number of carbon atoms of the mixture is between 8 and about 18 carbon atoms. Thus methyl alcohol may be admixed with stearyl alcohol to obtain a mixture having an average side chain length within the desired range.

One especially desirable mixture of alcohols operable in this invention is the commercially available mixture known as "Lorol B" alcohol and obtained by hydrogenation and refining of coconut oil. The distribution of the alcohols of this mixture and other commercially available alcohols are shown in the following table:

*Coconut oil alcohols*

|  | Lorol | Lorol B | Lorol 5 | Lorol 7 |
|---|---|---|---|---|
| Decyl | 4 | 3 | 2.6 | 2.5 |
| Lauryl | 55 | 46 | 61.0 | 55.5 |
| Tetradecyl | 22 | 24 | 23.0 | 21.0 |
| Hexadecyl | 14 | 10 | 11.2 | 10.2 |
| Octadecyl | 4 | 17 | 2.2 | 10.8 |
| Ave | 12.8 | 13.5 | 13.0 | 13.4 |

The preferred embodiment of this invention involves the use of esters of alpha-beta unsaturated dicarboxylic acids wherein the alcohol components of the ester contains an average of from 11 to 14 carbon atoms, the alcohols obtained by the hydrogenation of coconut oil being included within this preferred range.

Also very desirable copolymers may be formed by copolymerizing the polycarboxylic acid esters as described above with other polymerizable monomeric materials. These materials may be represented by the following formula:

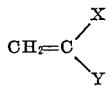

wherein:
(1) X is hydrogen and Y is an ester group

R being methyl, ethyl, butyl, and the like), e. g., vinyl acetate, vinyl butyrate, and the like; or
(2) X is methyl and Y is as described above, e. g., isopropenyl acetate, etc.; or
(3) X is a halogen and Y is as described above, e. g., alpha-chlorovinyl acetate, etc.; or
(4) X is hydrogen or methyl and Y is an aromatic group, e. g., styrene, alpha-methyl styrene, and the like; or
(5) X is hydrogen or methyl and Y is —C≡N, e. g., acrylonitrile, etc.

Although any of the polymerizable monomeric materials typified by the formula above are operable to form useful copolymers with the polycarboxylic acid esters outlined above, the preferred embodiment contemplates the use of low molecular weight vinyl esters and their substitution products. Vinyl acetate is particularly desirable.

Depending upon the desired product, the monomers in the copolymerization reaction utilizing the process of invention may be varied greatly. However, when a copolymer of a polycarboxylic acid ester and vinyl acetate is being prepared, it is desirable that from 2% to 40% of vinyl acetate, preferably 10% to 25%, be used with the polycarboxylic acid ester. A copolymer of 80% dicarboxylic acid ester with 20% vinyl acetate has outstanding pour depressant qualities.

The process of the instant invention may be applied to any of the well known polymerization techniques. For instance, the bulk polymerization technique wherein the catalyst used is added directly to the mixture of the monomers alone may be used applying the process of invention. If it is desired, the solution polymerization technique may be utilized, that is, the technique of polymerization in which the monomers are polymerized in solution in a solvent, such as naphtha, lubricating oil fractions, white oils, benzene, toluene, and other petroleum hydrocarbons, ethers, esters, chlorinated solvents such as CCl$_3$, CCl$_4$, etc. When the solution polymerization technique is used, it is preferred that the monomer concentration in the diluent range from 30% to 99% by weight, based on the weight of the total mixture. The suspension technique of polymerization or the emulsion polymerization technique wherein an emulsifying agent such as a soap is used to form an emulsion of the monomers and water and a water soluble catalyst is utilized may also be adapted to the process of invention with excellent results.

The reaction conditions to be experienced in the inventive process may also be varied within wide ranges. In the preferred embodiment, the copolymerization of dicarboxylic acid esters with other polymerizable materials, it is preferred that temperatures within a range of from room temperature to 250° F. be used, preferably between 100° to 200° F. Reaction times between 1 and 40 hours, preferably 3 to 24 hours may be used. In most instances it will be found advantageous to utilize from 0.05% to 3% by weight, based on the weight of the monomers, of a peroxide catalyst, with 0.2% to 2.0% by weight being preferred. Among the operable catalysts are hydrogen peroxide, benzoyl peroxide, cumene hydroperoxide, potassium persulfate, lauroyl peroxide, ammonium persulfate, urea hydroperoxide, tert.-butyl hydroperoxide, tert.-butyl perbenzoate, and the like, benzoyl peroxide being used in the preferred embodiment. Reduction-oxidation catalyst systems known as "Redox" systems, for example, benzoyl peroxide, benzoin and ferric laurate, may also be employed to good effect. It will be understood that the catalyst can be added entirely at the start or in several portions during the polymerization.

The instant invention is directed toward an improved process which comprises the addition to the monomers of a small amount of a strong acid. The introduction of this acid, to be more completely described below, results in the minimizing or preventing completely the formation of cross linkages of polymer chains. This cross linking results in a copolymer of appreciable lower pour point depressor potency, and, if allowed to proceed sufficiently far, results in the formation of an oil insoluble product.

It is believed that the use of strong acids as a means for modifying copolymers is novel. No disclosure of such procedure has been found either in the patent art or in the journal literature. In fact, it is well known that the literature teaches the use of alkaline agents as a regular component in emulsion copolymerization during the reaction in order to keep the stable emulsion during the copolymerization.

The strong acids which may be employed in this invention comprise strong mineral acids, the alkyl- and arylsulfonic acids, related acids comprising the atoms of the same group as sulfur and phosphorus in the periodic table, sulfuric acid, hydrochloric acid, phosphoric acid, and the like. Although any of the above described acids may be used, it is preferred to use alkyl sulfonic acids, aryl sulfonic acids, and sulfuric acids. Exemplary of the preferred sulfonic acids are petroleum sulfonic acids, toluene sulfonic acids, and the like. Sulfuric acid is especially preferred.

The concentration of acid used in the improved copolymerzation of this invention will range between .02 to 5.0% by weight based on the weight of the monomers. As especially preferred range is an acid concentration of from 0.1 to 1.5% by weight.

In order to more explicitly define the instant invention the following examples are presented.

EXAMPLE I

Into a 100 cc. polymerization tube was placed 30 g. of a fumarate ester of "Lorol B" alcohol, which is a commercially available mixture of alcohols obtained by hydrogenation of coconut oil and having an average carbon chain length of 13.5. The ester was prepared by reacting stoichiometric amounts of fumaric acid and the alcohol and was washed with dilute alkali. There was then added 7.5 g. of freshly distilled vinyl acetate. To the reaction mixture was added a total of 0.375 g. (1.0%) benzoyl peroxide. As a copolymerization modifier 1.87 g. (5.0%) of acetic acid was added and the reaction mixture was heated to about 130° F. for 24 hours. The resulting product was an oil-insoluble gel.

EXAMPLE II-IV

Following the procedure outlined in Example I above additional copolymerizations were carried out using as copolymerization modifiers 5.0 wt. percent propionic acid, 5.0 wt. percent of fumaric acid, and 1.0 wt. percent of p-toluene sulfonic acid.

The copolymerization products contained in Examples I through IV above were blended in various weight percents in a Mid-Continent SAE 20 grade oil having an ASTM pour point of +20° F. for determination of the pour depressing activities of the copolymers. The test data are set out in Table I below:

Table I

| Example No. | Acid Modifier | Wt. Percent Acid | ASTM Pour Point, °F. Blend in Mid-Continent SAE 20 Grade Oil. | | | |
|---|---|---|---|---|---|---|
| | | | 0.025 | 0.020 | 0.015 | 0.010 |
| I | Acetic Acid | 5.0 | Gel | Gel | Gel | Gel |
| II | Propionic Acid | 5.0 | Gel | Gel | Gel | Gel |
| III | Fumaric Acid | 5.0 | Gel | Gel | Gel | Gel |
| IV | p-Toluenesulfonic Acid | 1.0 | −25 | −25 | −25 | −20 |

An examination of the data in Table I above clearly points out the improved process of the invention. It is to be particularly noted that of the acids tested only p-toluene sulfonic acid resulted in an oil soluble copolymer, the weaker acids failing to prevent undesirable gelation. The ASTM pour point depressing data shows that this copolymer was outstanding in its pour point depressing potency, 0.01% of the active ingredient depressing the pour point of the blend by 40° F.

EXAMPLE V

Into a polymerization flask there was placed 30 g. of the fumaric ester of Example I and 7.5 g. of freshly distilled vinyl acetate. There was then added 0.375 g. of benzoyl peroxide (1.0 wt. percent) as a catalyst. "Lorol B" alcohol (1.87 g., 5%) was added to the reaction mixture. The test tube was heated to a temperature of 130° F. for 24 hours and the resulting product was an oil-insoluble gel.

EXAMPLE VI

This example duplicates the conditions and quantities of Example V above with the exception that a trace of sulfuric acid (<0.2 wt. %) was added as a copolymerization modifier.

EXAMPLE VII

In this example 0.375 g., 1.0%, of a petroleum sulfonic acid having a molecular weight of about 470 was added employed as a copolymerization modifier in a run that is otherwise duplicated in Example V above.

EXAMPLE VIII

The sodium salt of the same petroleum sulfonic acid used in Example VII was substituted for that acid in this example, the other ingredients and the conditions being the same as in Example V.

EXAMPLE IX

Into a test tube there was placed 30 g. of a maleate ester of "Lorol B" alcohol, the mixture of alcohols obtained by the hydrogenation of coconut oil and having an average chain length of 13.5. This ester was prepared using an excess of maleic anhydride over stoichiometric amounts and the ester was washed with dilute alkali. 7.5 g. of freshly distilled vinyl acetate was added along with 0.375 g. (1.0%) of benzoyl peroxide as a catalyst, and "Lorol B" alcohol (1.87 g., 5.0%) as a copolymerization modifier. The mixture was heated to a temperature of about 130° F. and maintained at that temperature for 24 hours.

EXAMPLE X

The conditions of Example IX are duplicated with the exception that 0.075 g. (0.2 wt. percent based on monomers) of sulfuric acid was added as a copolymerization modifier.

Blends of the copolymeric materials prepared in accordance with the procedures of Examples V through X above were prepared using as a base oil a Mid-Continent SAE 20 grade oil having the pour point of +20° F. The results are set out in Table II below:

Table II

| Copolymer | Copolymerization Modifier | Results |
|---|---|---|
| Ex. V (fumarate ester) | None | Gel. |
| Ex. VI (fumarate ester) | Sulfuric Acid | Oil soluble copolymer. |
| Ex. VII (fumarate ester) | Petroleum Sulfonic Acid. | Do. |
| Ex. VIII (fumarate ester) | Sodium Petroleum Sulfonate. | Gel. |
| Ex. IX (maleate ester) | None | Do. |
| Ex. X (maleate ester) | Sulfuric Acid | Oil soluble copolymer. |

An examination of the data reported in Table II above will point out that the sulfuric acid and the petroleum sulfonic acid are excellent copolymerization modifiers in both maleate ester-vinyl acetate copolymers and fumarate ester-vinyl acetate copolymers. The sodium salt of the petroleum sulfonic acid, however, is inefficacious in preventing gel formation. This points up the fact that it is the acidic constituent of the mixture which is responsible for the desired result.

EXAMPLE XI

A series of experiments was performed designed to define the operable limits as to the concentration of acid employed as copolymerization modifier. In these experiments "Lorol B" fumarate and vinyl acetate were copolymerized in an 80:20 ratio by weight, at 140° F. reaction temperature, for 24 hours, employing as catalyst 1% benzoyl peroxide catalyst added at the start. The results are set out in Table III below:

Table III

| Modifier | Wt. Percent Modifier | Vis. 210° 20% Conc. in Oil A [2] | ASTM Pour Point Mid-Con. SAE 20 Oil | |
|---|---|---|---|---|
| | | | 0.025 | 0.015 |
| Lorol B Alcohol | 5.0 | | Gel | Gel |
| Lorol B Alcohol | 5.0 | | ([3]) | ([3]) |
| Sulfuric Acid | 0.5 | | ([3]) | ([3]) |
| Conc. HCl aq | 5.0 | | ([3]) | ([3]) |
| Conc. HCl aq | 0.019 | 123.3 | −23 | −25 |
| H₃PO₄ | 5.0 | | ([3]) | ([3]) |
| H₃PO₄ | 0.017 | 197.4 | −25 | −25 |
| Alkane Sulfonic Acid | 5.0 | | ([3]) | ([3]) |
| Do | 1.0 | 117.6 | −20 | −25 |
| Ethyl Thiophosphoric Acid [1] | 5.0 | 71.9 | −25 | −25 |
| Do | 0.013 | | Gel | Gel |
| Dioctyl Phosphoric Acid | 5.0 | | Gel | Gel |

[1] 3.0% benzoyl peroxide catalyst.
[2] Disillate having a viscosity at 210° F. or 43 S. U. S.
[3] Little or no polymerization.

The above results show that in all instances 5.0 wt. percent of the acid used inhibits the polymerization so that only a small amount of the copolymer desired is formed. This, then, shows that the upper limit is definitely fixed at 5.0% by weight. The lower limit of the concentration of the acid will depend, to a certain extent upon the particular acid used. It is seen that in the case of ethyl thiophosphoric acid that the use of 0.013% by weight results in an oil insoluble gel and hence the undesirable cross linkage was not sufficiently inhibited. More of this acid must be used. As was pointed out hereinbefore concentrations of acid varying between about 0.02% and 5.0% by weight may be used, a preferred range varying between 0.1% and 1.5% by weight.

It has also been found that a combination of a small amount of a strong acid, i. e. the amounts set out hereinbefore, coupled with about 2.0% to 7.0%, based on the monomers of an alcohol having from about 8 to 18 carbon atoms per molecule is an excellent gel inhibiting combination for the copolymerizations described. It is preferred to use as the modifying alcohol, the one used to esterify the unsaturated polybasic acid. By using an excess of the esterifying alcohol to form the ester and retaining that excess in the subsequent copolymerization reaction, excellent results are obtained. This is shown in Example XII below.

EXAMPLE XII

A series of "Lorol B" fumarate-vinyl acetate copolymerizations was carried out on pilot plant scale, employing both sulfuric acid and "Lorol B" alcohol as copolymerization modifiers. The "Lorol B" fumarate ester monomer containing 0.37 wt. percent of sulfuric acid, which had been employed as the esterification catalyst. The reaction temperature was 155–160° F., and the catalyst was 1.0 wt. percent benzoyl peroxide added in some cases all at the start and in other cases in portions during the run. Data on the runs and on the pour depressing potency of the products are given in the following table.

centrates of the additives of invention may be prepared containing as high as 90% by weight of the additive material. It is often desirable to prepare these concentrates in such high concentrations for ease in handling and in storage.

The lubricant additives prepared according to the concept of this invention may be blended with any of the other known lubricant additives with excellent results. The inventive products are perfectly compatible with such materials as extreme pressure agents, oxidation inhibitors, other pour depressants, other viscosity index improvers, oiliness agents, corrosion inhibitors, and the like.

In summation, this invention relates to an improved process for the preparation of lubricating oil additives which comprises copolymerization of unsaturated polycarboxylic acid esters of alcohols, containing from 8 to 18 carbon atoms with other polymerizable monomeric materials in the presence of a strong acid. The presence of the acid inhibits gel formation and results in products having outstanding characteristics, particularly in regard to the ability to lower the temperature at which the oil blend loses its characteristic of free flow, that is, to reduce the pour point. The invention also contemplates the use of a combination of alcohol and acid to modify the copolymerization. The alcohol used may be any aliphatic alcohol having from 8 to 18 carbon atoms, and is preferably the one used to form the unsaturated acid ester.

Although a great many polymerizable materials are operable in the concept of this invention, the preferred embodiment contemplates the copolymerization of alpha-beta unsaturated dicarboxylic acid esters with vinyl esters in the presence of a peroxide catalyst and an acid selected from the group consisting of alkyl-or aryl-sulfonic acids and mineral acids, with toluene sulfonic acid and sulfuric acid being especially desirable.

Table IV

| Charge, Gallons | Alcohol [1] Modifier, Wt. Percent | Catalyst, Wt. Percent | Time, Hours | Viscosity [5] | Conversion, Wt. Percent | ASTM Pour Point, ° F. of Blends in Mid-Continent SAE-20 Base [6] | | | |
|---|---|---|---|---|---|---|---|---|---|
| | | | | | | 0.025 | 0.020 | 0.015 | 0.010 |
| 5 | 4.7 | 1.0 | 18 | 86.4 | 96.0 | −30 | −30 | −25 | −10 |
| 5 | 3.9 | 1.0 | 6 | 96.0 | | −30 | −30 | −25 | −20 |
| 5 | 3.1 | 1.0 | 4 | 103.7 | | −25 | −25 | −15 | −5 |
| 20 | 6.4 | [2] 1.2 | 8.5 | 72.5 | 97.5 | −25 | −25 | −30 | −20 |
| | | | 19.0 | 80.0 | 98.5 | −25 | −25 | −30 | −30 |
| 20 | 6.4 | [3] 0.8 | 7.0 | 72.0 | 95.5 | −25 | −20 | −20 | −25 |
| | | | 15.0 | 80.4 | 99+ | −30 | −30 | −30 | −30 |
| 20 | 3.2 | [4] 0.6 | 6.5 | 93.3 | 97.5 | −25 | −25 | −25 | −25 |
| 20 | 1.6 | [4] 0.3 | 6.5 | 99.0 | 81.5 | −30 | −30 | −30 | −25 |
| Commercial Pour Depressant | | | | | | −5 | −5 | 0 | +5 |

[1] Wt. percent Lorol B alcohol based on total monomers used.
[2] 0.6 Wt. percent catalyst added in three equal portions during first four hours of reaction time; balance added during remaining 20 hours reaction time had no appreciable effect on reaction.
[3] 0.6 Wt. percent catalyst added in three equal portions during first two hours reaction time; remaining 0.2 Wt. percent catalyst had no appreciable effect on reaction.
[4] Added in three equal portions during first two hours reaction time.
[5] Viscosity S. U. S. at 210° F. of 20 Wt. percent blend in a solvent extracted Mid-Continent oil having a viscosity of 43 S. U. seconds at 210° F.
[6] ASTM pour point of base stock +20° F.

An examination of the data in Table IV above will point out the fact that copolymeric materials prepared by utilizing 0.37 weight percent of sulfuric acid and from 1.6 to 6.4 weight percent of "Lorol B" alcohol as modifiers have excellent pour point depressing potency.

The products prepared by the process of this invention may be blended with lubricating oils in concentrations varying from .001% to 10%, percentages being by weight based on the weight of the total active ingredient. For pour depressing action it is preferred that from .003% to 5% of the additive be blended with the lubricating oil. For viscosity index improvement amounts varying between 0.5% and 10% may be used. If it is desired, con-

What is claimed is:

1. In a process for the formation of lubricating oil additive materials which comprises copolymerizing (1) a substantially neutral ester of (a) substantially saturated primary aliphatic alcohol containing in the range of 1 to 18 carbon atoms and averaging about 7.5 or more carbon atoms per molecule and of (b) a material of the class consisting of alpha, beta unsaturated polycarboxylic acids and their anhydrides with (2) a low molecular weight vinyl ester in the presence of a peroxide catalyst, the improvement which comprises the use of about 0.02% to 5.0% by weight, based on the weight of the monomers, of a strong acid as a copolymerization modifier.

2. In a process for the formation of lubricating oil additive materials which comprises copolymerizing (1) about 98 to 60% by weight of a substantially neutral ester of (a) substantially saturated primary aliphatic alcohol containing in the range of 8 to 18 carbon atoms per molecule and of (b) a material of the class consisting of alpha, beta unsaturated polycarboxylic acids and their anhydrides with (2) about 2 to 40% by weight of a low molecular weight vinyl ester in the presence of a peroxide catalyst, the improvement which comprises the use of about 0.1 to 1.5% by weight of a strong acid selected from the group consisting of aryl sulfonic acids, alkyl sulfonic acids and mineral acids as a copolymerization modifier.

3. A process according to claim 2 wherein said material of the class is fumaric acid.

4. A process according to claim 2 wherein said material of the class is maleic anhydride.

5. A process according to claim 2 wherein said low molecular weight vinyl ester is vinyl acetate.

6. In a process for the formation of lubricating oil additive materials which comprises copolymerizing (1) about 90 to 75% by weight of a substantially neutral ester of (a) substantially saturated primary aliphatic alcohol containing in the range of 8 to 18 carbon atoms per molecule and of (b) a material of the class consisting of alpha, beta unsaturated polycarboxylic acids and their anhydrides with (2) about 10 to 25% by weight of a low molecular weight vinyl ester in the presence of a benzoyl peroxide catalyst, at a temperature of about 100° to 200° F. for from about 3 to about 24 hours, the improvement which comprises carrying out said copolymerization in the presence of about 0.1 to 1.5% by weight of sulfuric acid as a copolymerization modifier.

7. In a process for the formation of lubricating oil additive materials which comprises copolymerizing (1) about 90 to 75% by weight of a substantially neutral ester of (a) substantially saturated primary aliphatic alcohol containing in the range of 8 to 18 carbon atoms per molecule and of (b) a material of the class consisting of alpha, beta unsaturated polycarboxylic acids and their anhydrides with (2) about 10 to 25% by weight of a low molecular weight vinyl ester in the presence of a benzoyl peroxide catalyst, at a temperature of about 100° to 200° F. for from about 3 to about 24 hours, the improvement which comprises carrying out said copolymerization in the presence of about 0.1 to 1.5% by weight of toluene sulfonic acid as a copolymerization modifier.

8. In a process for the formation of lubricating oil additive materials which comprises copolymerizing (1) about 98 to 60% by weight of a substantially neutral ester of (a) substantially saturated primary aliphatic alcohol containing in the range of 8 to 18 carbon atoms per molecule and of (b) a material of the class consisting of alpha, beta unsaturated polycarboxylic acids and their anhydrides, said ester having been prepared in the presence of an excess of about 2 to 7% by weight of the esterifying alcohol, with (2) about 2 to 40% by weight of a low molecular weight vinyl ester in the presence of a peroxide catalyst at a temperature within a range of from 100° to 200° F. for a period of time of about 3 to about 14 hours, the improvement which comprises carrying out said copolymerization in the presence of the excess of the esterifying alcohol and about 0.1 to 1.5% by weight of a strong acid as a copolymerization modifier.

9. A process according to claim 8 wherein said strong acid is sulfuric acid.

10. A process according to claim 8 wherein said strong acid is toluene sulfonic acid.

11. A lubricating oil additive material having the desirable characteristics of improving the pour point of a mineral lubricating oil into which it has been incorporated which has been prepared by an improved process which comprises copolymerizing (1) about 98 to 60% by weight of a substantially neutral ester of (a) substantially saturated primary aliphatic alcohol containing in the range of 8 to 18 carbon atoms per molecule and of (b) a material of the class consisting of alpha, beta unsaturated polycarboxylic acids and their anhydrides with (2) about 2 to 40% by weight of a low molecular weight vinyl ester in the presence of a peroxide catalyst and about 0.1 to 1.5% by weight of a strong acid selected from the group consisting of aryl sulfonic acids, alkyl sulfonic acids and mineral acids as a copolymerization modifier.

References Cited in the file of this patent

UNITED STATES PATENTS

| 2,306,071 | McNally et al. | Dec. 22, 1942 |
| 2,415,400 | Armstrong | Feb. 11, 1947 |
| 2,454,284 | Kirk | Nov. 23, 1948 |
| 2,462,422 | Plambeck | Feb. 22, 1949 |
| 2,570,788 | Giammaria | Oct. 9, 1951 |
| 2,575,992 | Bartlett | Nov. 20, 1951 |

FOREIGN PATENTS

| 962,826 | France | Dec. 19, 1949 |
| 635,903 | Great Britain | Apr. 19, 1950 |